United States Patent [19]

Haun et al.

[11] 4,060,927
[45] Dec. 6, 1977

[54] FISH WEIGHT BLIND BINDING

[76] Inventors: William A. Haun; Gladys M. Haun, both of 3504 Meadowlark Drive, Casper, Wyo. 82601

[21] Appl. No.: 730,346

[22] Filed: Oct. 7, 1976

[51] Int. Cl.² .............................................. A01K 95/00
[52] U.S. Cl. ..................................... 43/43.1; 43/44.94
[58] Field of Search .................. 43/43.1, 44.87, 44.94, 43/44.96, 44.97, 43.13

[56] References Cited

U.S. PATENT DOCUMENTS

| | | | |
|---|---|---|---|
| 1,883,574 | 10/1932 | Cleeland | 43/43.1 |
| 2,067,165 | 1/1937 | Albiser | 43/44.94 |
| 2,851,816 | 9/1958 | Gehrig | 43/43.1 |
| 2,934,850 | 5/1960 | Moe | 43/43.13 |
| 3,701,212 | 10/1972 | Gilliam | 43/44.87 |

Primary Examiner—Warner H. Camp

[57] ABSTRACT

A fishing sinker consists of a lead weight and a length of stainless steel wire, the lead body of the sinker being elongated in shape and triangular in transverse cross-section, each opposite end of the lead body having a wire coil extending therefrom, the length of wire in one form of the invention being wrapped five times around the lead body and in another design the length of wire being threaded through the coils at each end.

1 Claim, 9 Drawing Figures

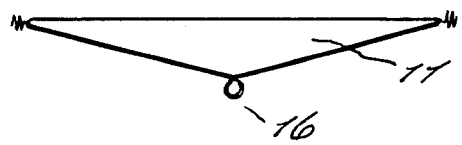
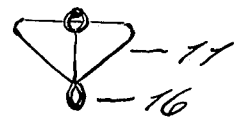
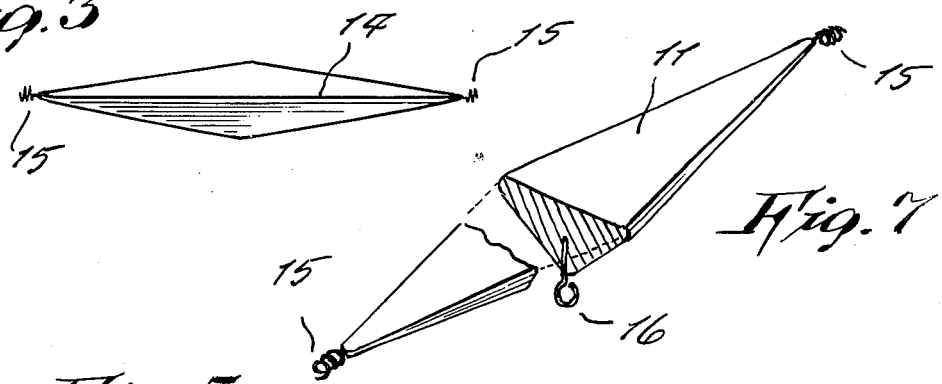
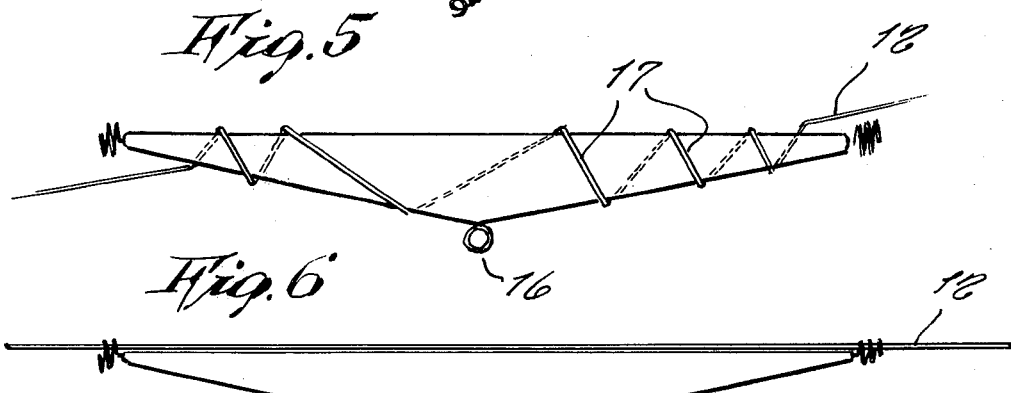
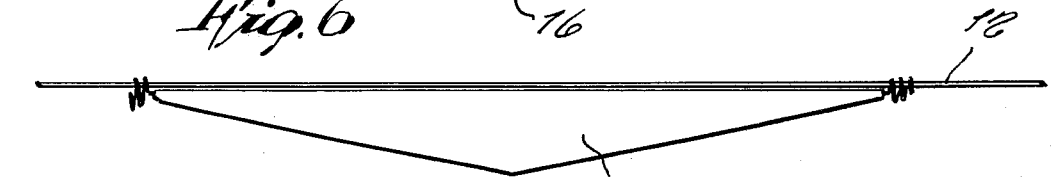
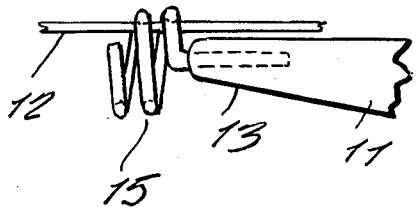
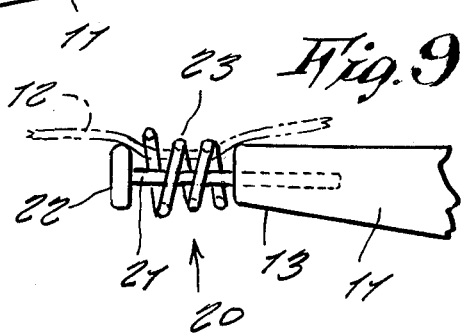

FISH WEIGHT BLIND BINDING

This invention relates generally to fishing sinkers.

A principal object of the present invention is to provide a fishing sinker which has advantages over conventional fishing sinkers by having no knots to tie, requires no threading through, and no crimping which might damage a fishing line.

Another object of the present invention is to provide a fishing sinker which when a fishing line is pulled in, travels without the weight body turning over and over because the fishing sinker is shaped like a keel of a boat.

Still another purpose is to provide a fishing sinker which may be made in different lengths and weights so as to be suitable for all types of fishing.

Other objects are to provide a fishing sinker which is simple in design, inexpensive to manufacture, rugged in construction, easy to use and efficient in operation.

These and other objects will be readily evident upon a study of the following specification and accompanying drawing wherein:

FIG. 1 is a top view of the present invention, and shown drawn to a true size;

FIG. 2 is a side view thereof;

FIG. 3 is a bottom view;

FIG. 4 is an end view;

FIG. 5 is an enlarged side view showing one design of non-slip line with the line coiled around the sinker.

FIG. 6 is an enlarged side view showing a non-slip line with the line passed through the eyelets.

FIG. 7 is a fragmentary perspective view of the device shown in FIGS. 1 through 4.

FIG. 8 is an enlarged detail showing the eyelet comprised of two and one-half turns.

FIG. 9 is a similar view of another design of eyelet for more quickly and easily fitting a fishing line therethrough.

Referring now to the drawing in greater detail, and more particularly to FIGS. 1 through 8 thereof at this time, the reference numeral 10 represents a fishing sinker according to the present invention which includes a lead weight 11 and a length of stainless steel wire 12.

The lead weight forming the main body of the fishing sinker is elongated in shape and tapers from its center 12' toward each opposite end 13. As clearly shown in FIGS. 4 and 7, the lead weight body is triangular in cross-sectional shape transversely, a lower triangular corner of the body forming a longitudinally extending keel as shown at 14. At each opposite tapering end 13 there is an eyelet 15 formed by a coiled wire, one end of which, is embedded within the tapered end of the weight body. The eyelet coils are each around a common, aligned axis. An eyelet 16 extending downwardly from a center of the keel 14 is provided for snelled hooks and the like.

While the fishing sinker may be made in different sizes, one particular size thereof would have a weight body of three inches length, one-half inch in height at a center thereof and one-half inch thick at the center transversely. The stainless steel wire could be from three to five inches in length and have a diameter of 0.030. For other sizes of the fishing sinker, these dimensions would be accordingly varied.

In FIG. 5, the fishing sinker is shown having five or more turns 17 of the wire 12 around the weight body so as to form a non-slip line. In FIG. 6, the wire 12 is shown passing through the eyelets 15 at each end of the weight and there are no turns around the sinker body. Thus different methods of use are indicated for the fishing sinker.

If a fisherman uses the weight as a non-slip sinker, it should be used as shown in FIG. 5. By placing the fishing line parallel with the length of the weight, and turning the wire overhand or underhand 5 or more times, the weight is thus secured to the line. When using the weight as a slip through sinker, the fisherman would follow the illustration shown in FIG. 6 with the line passing through the eyelets 15.

If a fisherman is trolling the top ten feet of the water surface with a lure or streamer, due to the conditions of the fish feeding, he starts feeding lower down initially. All he needs to do is put on a weight leaving the pole in the trolling position and it will slide down the line to the desired depth that he wishes, depending upon what weight is placed on the line.

The present invention is also particularly suitable for fishing in a fast running river or stream. An example would be to put on a heavy blind binder on the end of the fishing line. Using a smaller blind binder, as a slip through, the fisherman would tie a small lure or streamer to it. When taking the pole upstream or downstream, the fisherman moves the line across at random.

Reference is now made to FIG. 9 of the drawing wherein there is a modified design of eyelet 20 which differs from the above described eyelet 15. While the eyelet 15 comprises a metal wire coil having one end embedded within the end of the weight body, the eyelet 20 consists of a pin 21 having one end embedded within the weight body, the opposite end of the pin having an enlarged head 22. A separate wire coil 23 is fitted around the pin and is located between the head 22 and the end of the weight body, the coil being completely free to rotate about the pin. In threading a line on this eyelet, the fisherman simply freely rotates the coil so that each turn of the coil progressively rotates around the line. Thus the line can be more quickly and easily attached. Thus a modified design is provided.

While various changes may be made in the detail construction, it is understood that such changes will be within the spirit and scope of the present invention as is defined by the appended claims.

What we claim is:

1. A fish weight blind binder, comprising, in combination, an elongated lead weight and a length of stainless steel wire, said weight being substantially triangular in transverse cross-section, said weight having a boat keel shape and having a downward eyelet at its center for snelled hooks, opposite ends of said weight tapering triangularly and each end having an eyelet, said eyelets at each end comprising a rotatable wire coil around a stationary pin, said stainless steel wire being spirally wrapped five or more turns around said weight so as to form three sharp bends upon each single turn around said weight, said stainless steel wire additionally selectively being insertable through said end eyelets.

* * * * *